W. G. BETZ.
SLIDING PANEL FOR PNEUMATIC PIANOS.
APPLICATION FILED MAY 11, 1910.
986,621.
Patented Mar. 14, 1911.
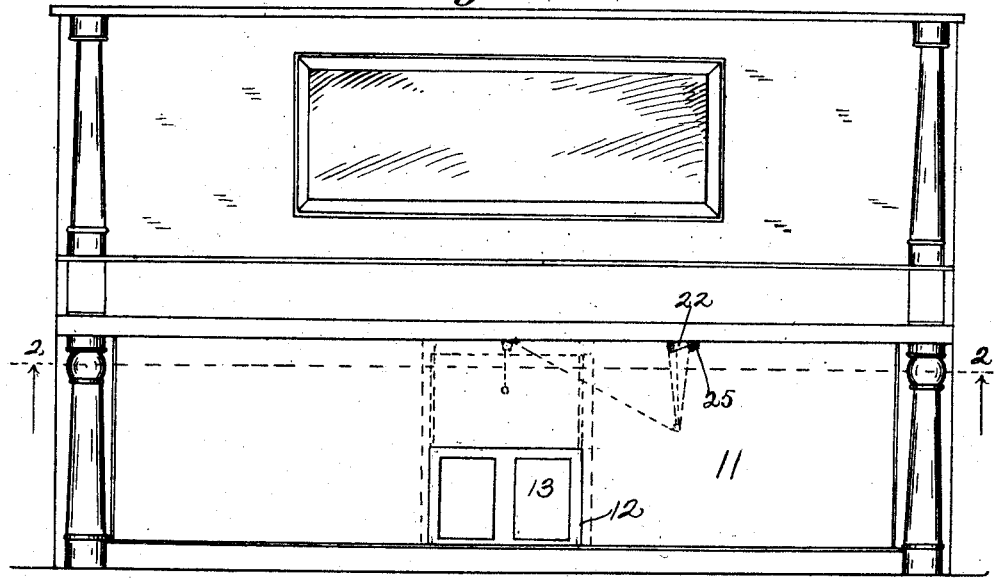
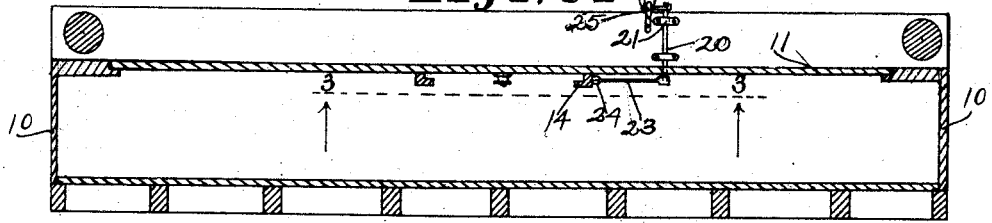
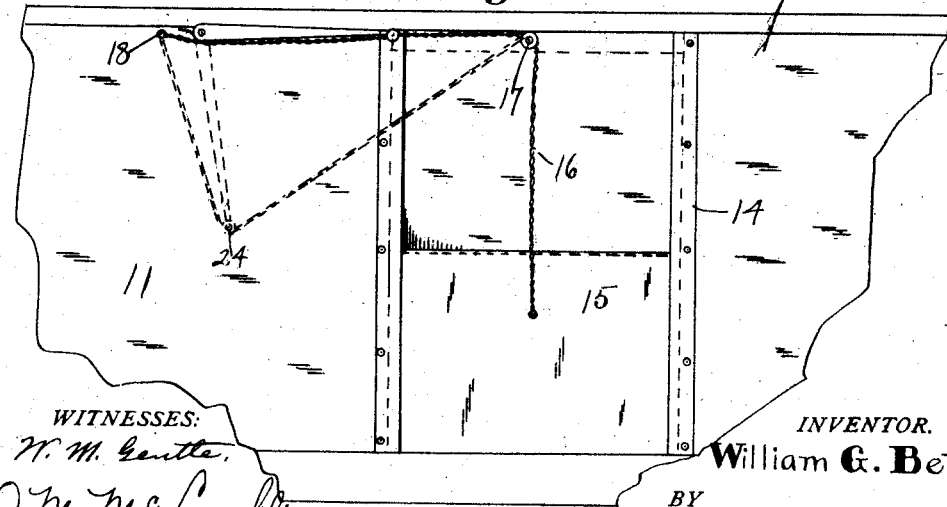
WITNESSES:
INVENTOR.
William G. Betz.
BY
ATTORNEY.

UNITED STATES PATENT OFFICE.

WILLIAM G. BETZ, OF STEGER, ILLINOIS, ASSIGNOR TO STEGER & SONS PIANO MANUFACTURING COMPANY, OF CHICAGO, ILLINOIS, A CORPORATION OF ILLINOIS.

SLIDING PANEL FOR PNEUMATIC PIANOS.

986,621.  Specification of Letters Patent.  Patented Mar. 14, 1911.

Application filed May 11, 1910. Serial No. 560,683.

*To all whom it may concern:*

Be it known that I, WILLIAM G. BETZ, of Steger, county of Cook, and State of Illinois, have invented a certain new and useful Sliding Panel for Pneumatic Pianos; and I do hereby declare that the following is a full, clear, and exact description thereof, reference being had to the accompanying drawings.

The object of this invention is to provide a convenient and satisfactory means for closing the pedal openings of pneumatic pianos, when said pedals are not in use, and means for elevating said pedal panels when said pedals are in use.

The chief feature of the invention consists in providing a guideway on the case of the piano at each side of the pedal opening, and mounting a vertically slidable panel therein, adapted when in its lower position to close the pedal opening. A cord is connected with said panel, and means are mounted in connection with the front rail of the piano for operating said cord so as to elevate the panel when desired, and the panel returns to its normal position by gravity.

The nature of this invention will be understood from the accompanying drawings and the following description and claims.

In the drawings Figure 1 is a front elevation of a pneumatic piano with the pedal opening open. Fig. 2 is a horizontal section on the line 2—2 of Fig. 1. Fig. 3 is an inside elevation of the front wall of the casing viewed from the line 3—3 of Fig. 2, parts being broken away, and the position of parts when the panel is closed being indicated by full lines, and their positions when the panel is elevated being indicated by dotted lines.

In detail, 10 represents the case of a piano, 11 the lower front frame thereof which is removable 12 the pedal opening therein and 13 the pedals. At each side of the pedal opening a vertically disposed guide 14 is secured on the inside of the frame 11, and between said guides a panel 15 is arranged to be vertically slidable, said panel being large enough to close the pedal opening. When it is desired to use the pedals, the sliding panel is elevated to the position shown in Fig. 1.

The means for elevating the panel as herein shown consists of a cord 16 secured to the panel 15 midway between its ends, and said cord passes up over a pulley 17 that is fastened to the frame 11 immediately below the key bed rail, and the upper end of the cord extends laterally and at its end 18 is secured to the frame 11. A crank shaft 20 is horizontally mounted in the bearings 21 and the underside of the key bed rail 11, and on its outer end there is a handle 22, and on the inner end a crank arm 23 which carries a roller 24 thereon in position to engage the cord between its connection 18 and the pulley 17 and depress it from the full-line position shown in Fig. 3 to the dotted-line position, which movement will elevate the panel. When the handle 22 of the crank shaft is released, gravity will close the panel and the cord 16 will turn the crank arm 23 to its upper position immediately under the key bed rail where it is practically obscured by the key bed rail. The catch 25 is secured to the underside of the key bed rail 11 in position to engage the handle 22, when the panel 15 is in its elevated position, and hold said parts in that position while the pedals are being used. When the pedals are not used, the handle 22 is disengaged from the catch and the panel descends by gravity and closes the pedal opening. The panel, guides and cord are all on the inside of the front frame 11 which is removable. Hence the guides and cord are obscured and the panel is likewise obscured when it is elevated, and the panel, cord and pulley are removable along with the lower frame plate 11. Furthermore, the crank arm 23 is behind the frame 11 of the case so that the handle 22 and catch 25 are the only parts of the device that shows from a position in front of the piano.

I claim as my invention:

1. The combination with a piano case having a key bed rail, and a pedal opening, of a vertical guide on the inside of said case at each side of said pedal opening, a panel vertically slidable in said guides, a cord connected at one end with said panel and at the other end fixedly secured to said case, and a crank mounted on the key bed rail adapted at its outer end when operated to engage said cord intermediate its ends and elevate the panel.

2. The combination with a piano case having a key bed rail, and a pedal opening having a vertical guide on the inside of said case on each side of said panel opening, a panel vertically slidable in said guides, a pulley mounted on the inside of said case near the key bed rail and centrally over the panel, a cord connected with the panel and extending up over said pulley and connected with the case near the key bed rail and to one side of the guideway of the panel, and a crank mounted in connection with the key bed rail provided with a roller on its outer end adapted when the crank is operated to engage said cord between the pulley and connection of the cord with the piano case and depress said cord for elevating the panel.

3. The combination with a piano case having a removable lower front frame plate with a pedal opening therein, and a key bed rail, of a panel slidable on the inner surface of said removable frame plate for closing said pedal opening, a cord fixedly secured at one end to said panel and at the other end to said frame plate, and means mounted in connection with the key bed rail and independently of said frame plate which is adapted to engage the cord intermediate its ends and actuate the same for elevating the panel.

In witness whereof, I have hereunto affixed my signature in the presence of the witnesses herein named.

WILLIAM G. BETZ.

Witnesses:
H. C. WEHLAN,
OLGA PETERSON.

---

Copies of this patent may be obtained for five cents each, by addressing the "Commissioner of Patents, Washington, D. C."